United States Patent
Erdogan

(10) Patent No.: US 10,481,645 B2
(45) Date of Patent: Nov. 19, 2019

(54) SECONDARY GESTURE INPUT MECHANISM FOR TOUCHSCREEN DEVICES

(71) Applicant: Lucan Patent Holdco, LLC, Loveland, CO (US)

(72) Inventor: Murat Erdogan, Evans, CO (US)

(73) Assignee: Lucan Patent Holdco, LLC, Loveland, CO (US)

( * ) Notice: Subject to any disclaimer, the term of this patent is extended or adjusted under 35 U.S.C. 154(b) by 203 days.

(21) Appl. No.: 14/852,387

(22) Filed: Sep. 11, 2015

(65) Prior Publication Data
US 2017/0075392 A1    Mar. 16, 2017

(51) Int. Cl.
G06F 1/16 (2006.01)
G06F 3/0488 (2013.01)
G06F 3/0354 (2013.01)

(52) U.S. Cl.
CPC ........... *G06F 1/1692* (2013.01); *G06F 1/169* (2013.01); *G06F 1/1643* (2013.01); *G06F 3/03547* (2013.01); *G06F 3/04883* (2013.01); *G06F 2203/0339* (2013.01)

(58) Field of Classification Search
CPC .. G06F 3/0412; G06F 3/0416; G06F 3/04883; G06F 1/1692
See application file for complete search history.

(56) References Cited

U.S. PATENT DOCUMENTS

| | | |
|---|---|---|
| 5,392,388 A | 2/1995 | Gibson |
| 5,434,757 A * | 7/1995 | Kashiwagi ........... B60N 2/4693 200/314 |
| 5,488,204 A | 1/1996 | Mead et al. |
| 5,717,877 A | 2/1998 | Orton et al. |
| 6,492,978 B1 | 12/2002 | Selig et al. |
| 6,630,929 B1 | 10/2003 | Adler et al. |
| 7,315,336 B2 | 1/2008 | North et al. |
| 7,714,840 B2 | 5/2010 | Hinckley et al. |
| 7,777,716 B2 | 8/2010 | Rosenberg et al. |
| 7,840,909 B2 | 11/2010 | Kim |
| 7,843,516 B2 | 11/2010 | Cernasov |
| 7,936,341 B2 | 5/2011 | Weiss |
| 7,978,183 B2 | 7/2011 | Rosenberg et al. |

(Continued)

FOREIGN PATENT DOCUMENTS

| | | |
|---|---|---|
| WO | 2000031614 A1 | 6/2000 |
| WO | 2002035460 A1 | 5/2002 |
| WO | 2006007390 A2 | 1/2006 |

*Primary Examiner* — Sahlu Okebato
(74) *Attorney, Agent, or Firm* — Russell Krajec; Krajec Patent Offices, LLC

(57) ABSTRACT

A touchscreen device may have a secondary touch-enabled gesture input mechanism located near one or more edges of a touchscreen. The gesture input mechanism may sense several gestures, including swiping, sliding, zooming, tapping, and other gestures, and may cooperate or supplement similar gestures that a user may make with the touchscreen. The gesture input mechanism may be located parallel to one edge of a touchscreen, such that a user may operate the input device without blocking the touchscreen. The gesture input mechanism may be located on a parallel, perpendicular, angled, or other surface with respect to the touchscreen. Some devices may have gesture input mechanisms located around one or more sides of the touchscreen.

21 Claims, 5 Drawing Sheets

(56) References Cited

U.S. PATENT DOCUMENTS

| | | |
|---|---|---|
| 8,094,130 B2 | 1/2012 | Griffin et al. |
| 8,169,421 B2 | 5/2012 | Wright et al. |
| 8,217,905 B2 | 7/2012 | Kim et al. |
| 8,259,083 B2 | 9/2012 | Kim |
| 8,310,456 B2 | 11/2012 | Kim et al. |
| 8,368,662 B2 | 2/2013 | Argiro |
| 8,378,980 B2 | 2/2013 | Tsai |
| 8,390,584 B1 | 3/2013 | Bhojan |
| 8,411,069 B1 | 4/2013 | Huang |
| 8,418,077 B2 | 4/2013 | Allen, Jr. et al. |
| 8,427,432 B2 | 4/2013 | Kim et al. |
| 8,429,555 B2 | 4/2013 | Cho et al. |
| 8,436,829 B1 | 5/2013 | Zhai et al. |
| 8,441,451 B2 | 5/2013 | Son |
| 8,451,232 B2 | 5/2013 | Tolmasky et al. |
| 8,509,854 B2 | 8/2013 | Kim et al. |
| 8,531,427 B2 | 9/2013 | Jang |
| 8,555,184 B2 | 10/2013 | Hong et al. |
| 8,595,644 B1 | 11/2013 | Clark |
| 8,595,646 B2 | 11/2013 | Kang |
| 8,599,142 B2 | 12/2013 | Prados et al. |
| 8,599,162 B2 | 12/2013 | Argiro |
| 8,612,888 B2 | 12/2013 | Pennington et al. |
| 8,631,317 B2 | 1/2014 | Kangas et al. |
| 8,650,502 B2 | 2/2014 | Lentz et al. |
| 8,675,019 B1 | 3/2014 | Feinstein |
| 8,689,128 B2 | 4/2014 | Chaudhri et al. |
| 8,694,903 B2 | 4/2014 | Tiwari et al. |
| 8,694,910 B2 | 4/2014 | Lambourne et al. |
| 8,698,760 B2 | 4/2014 | Prendergast et al. |
| 8,713,471 B1 | 4/2014 | Rowley et al. |
| 8,730,174 B2 | 5/2014 | Lindsay |
| 8,732,613 B2 | 5/2014 | Li et al. |
| 8,812,977 B2 | 8/2014 | Naderi |
| 8,860,674 B2 | 10/2014 | Lee et al. |
| 8,860,717 B1 | 10/2014 | Zeiger et al. |
| 8,878,799 B2 | 11/2014 | Lee et al. |
| 8,893,056 B2 | 11/2014 | Jung et al. |
| 8,947,376 B2 | 2/2015 | Sirpal et al. |
| 8,976,120 B2 | 3/2015 | Griffin |
| 8,977,981 B2 | 3/2015 | Willis et al. |
| 8,977,985 B2 | 3/2015 | Matsushima et al. |
| 8,988,356 B2 | 3/2015 | Tseng |
| 8,990,732 B2 | 3/2015 | Farrenkopf et al. |
| 9,009,588 B2 | 4/2015 | Zalewski et al. |
| 9,021,382 B2 | 4/2015 | Kim et al. |
| 9,024,895 B2 | 5/2015 | Yang et al. |
| 9,063,645 B1 | 6/2015 | Jitkoff et al. |
| 9,063,646 B2 | 6/2015 | Ozawa et al. |
| 9,063,647 B2 | 6/2015 | Zotov et al. |
| 9,081,428 B2 | 7/2015 | Liu |
| 9,086,793 B2 | 7/2015 | Siegel et al. |
| 9,098,407 B2 | 8/2015 | Cho et al. |
| 9,110,566 B2 | 8/2015 | Kim |
| 9,113,193 B1 | 8/2015 | Gardes et al. |
| 9,122,372 B2 | 9/2015 | Allen et al. |
| 9,131,192 B2 | 9/2015 | Ubillos et al. |
| 2003/0058265 A1 | 3/2003 | Robinson |
| 2006/0066586 A1 | 3/2006 | Gally et al. |
| 2006/0238517 A1* | 10/2006 | King ............... G06F 1/1626 345/173 |
| 2007/0057924 A1 | 3/2007 | Prados et al. |
| 2007/0057928 A1 | 3/2007 | Prados et al. |
| 2008/0018609 A1* | 1/2008 | Baker ............... G06F 3/045 345/173 |
| 2008/0055495 A1 | 3/2008 | Cernasov |
| 2009/0046068 A1 | 2/2009 | Griffin |
| 2009/0102801 A1 | 4/2009 | Araki et al. |
| 2009/0122022 A1 | 5/2009 | Park et al. |
| 2009/0195518 A1 | 8/2009 | Mattice et al. |
| 2009/0244019 A1 | 10/2009 | Choi |
| 2010/0053120 A1 | 3/2010 | Chang et al. |
| 2010/0097324 A1 | 4/2010 | Anson et al. |
| 2010/0156822 A1 | 6/2010 | Lee et al. |
| 2010/0201644 A1* | 8/2010 | Ohshita ............... G06F 3/04883 345/173 |
| 2010/0207895 A1 | 8/2010 | Joung et al. |
| 2010/0302175 A1 | 12/2010 | Fratti |
| 2010/0315354 A1 | 12/2010 | Park et al. |
| 2011/0157046 A1* | 6/2011 | Lee ............... G04G 21/08 345/173 |
| 2011/0193786 A1 | 8/2011 | Futter et al. |
| 2011/0242043 A1 | 10/2011 | Yarvis et al. |
| 2011/0261001 A1 | 10/2011 | Liu |
| 2012/0026077 A1 | 2/2012 | Hackborn |
| 2012/0026118 A1 | 2/2012 | Hackborn |
| 2012/0034888 A1 | 2/2012 | De Flaviis |
| 2012/0110517 A1 | 5/2012 | Sparks et al. |
| 2012/0133615 A1 | 5/2012 | Argiro |
| 2012/0176331 A1* | 7/2012 | Nakao ............... G06F 3/0362 345/173 |
| 2012/0182262 A1 | 7/2012 | Fritzley et al. |
| 2012/0212434 A1 | 8/2012 | Bluemler |
| 2012/0256862 A1 | 10/2012 | Wagner |
| 2012/0256867 A1 | 10/2012 | Annacone |
| 2012/0274583 A1 | 11/2012 | Haggerty |
| 2012/0282886 A1 | 11/2012 | Amis |
| 2012/0327001 A1 | 12/2012 | Higginson |
| 2013/0021265 A1 | 1/2013 | Selim |
| 2013/0021266 A1 | 1/2013 | Selim |
| 2013/0021273 A1 | 1/2013 | Lee et al. |
| 2013/0082940 A1 | 4/2013 | Mainwring et al. |
| 2013/0082983 A1 | 4/2013 | Liu |
| 2013/0088445 A1 | 4/2013 | Kang |
| 2013/0106710 A1 | 5/2013 | Ashbrook |
| 2013/0141349 A1 | 6/2013 | Song et al. |
| 2013/0154959 A1* | 6/2013 | Lindsay ............... G06F 1/1694 345/173 |
| 2013/0254717 A1 | 9/2013 | Al-Ali et al. |
| 2013/0293506 A1 | 11/2013 | El-Khaled et al. |
| 2014/0043264 A1 | 2/2014 | Kelley et al. |
| 2014/0049480 A1 | 2/2014 | Rabii |
| 2014/0145992 A1 | 5/2014 | Xiong et al. |
| 2014/0160085 A1 | 6/2014 | Rabii et al. |
| 2014/0168100 A1 | 6/2014 | Argiro |
| 2014/0189551 A1 | 7/2014 | Kim |
| 2014/0189604 A1 | 7/2014 | Garrison et al. |
| 2014/0198054 A1 | 7/2014 | Sharma et al. |
| 2014/0240262 A1 | 8/2014 | Paul |
| 2014/0282103 A1 | 9/2014 | Crandall |
| 2014/0282243 A1 | 9/2014 | Eye |
| 2014/0285467 A1* | 9/2014 | Prendergast ............... G06F 3/0416 345/174 |
| 2014/0293154 A1 | 10/2014 | Philipp |
| 2014/0314115 A1 | 10/2014 | Friedrichs et al. |
| 2014/0327628 A1 | 11/2014 | Tijssen et al. |
| 2014/0347292 A1 | 11/2014 | Huang |
| 2015/0022481 A1 | 1/2015 | Andersson et al. |
| 2015/0026624 A1 | 1/2015 | Hui et al. |
| 2015/0029113 A1 | 1/2015 | Lee et al. |
| 2015/0070282 A1 | 3/2015 | Johansson et al. |
| 2015/0091871 A1 | 4/2015 | Zank |
| 2015/0109230 A1 | 4/2015 | Long |
| 2015/0109253 A1 | 4/2015 | Wu |
| 2015/0113455 A1 | 4/2015 | Kang et al. |
| 2015/0123913 A1 | 5/2015 | Kerdemelidis |
| 2015/0145784 A1 | 5/2015 | Dowd et al. |
| 2015/0193010 A1 | 7/2015 | Tsukamoto et al. |
| 2015/0193142 A1 | 7/2015 | Min |
| 2015/0220207 A1 | 8/2015 | Jan |
| 2015/0227226 A1 | 8/2015 | Wierenga et al. |
| 2015/0264169 A1* | 9/2015 | Yim ............... H04M 1/72563 455/411 |

* cited by examiner

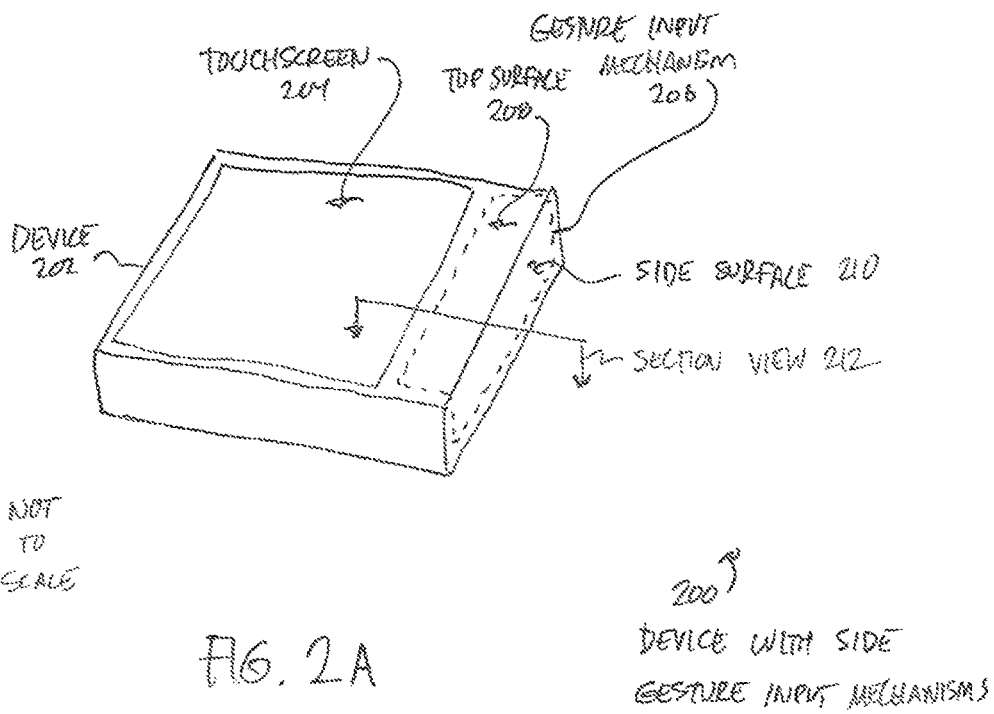
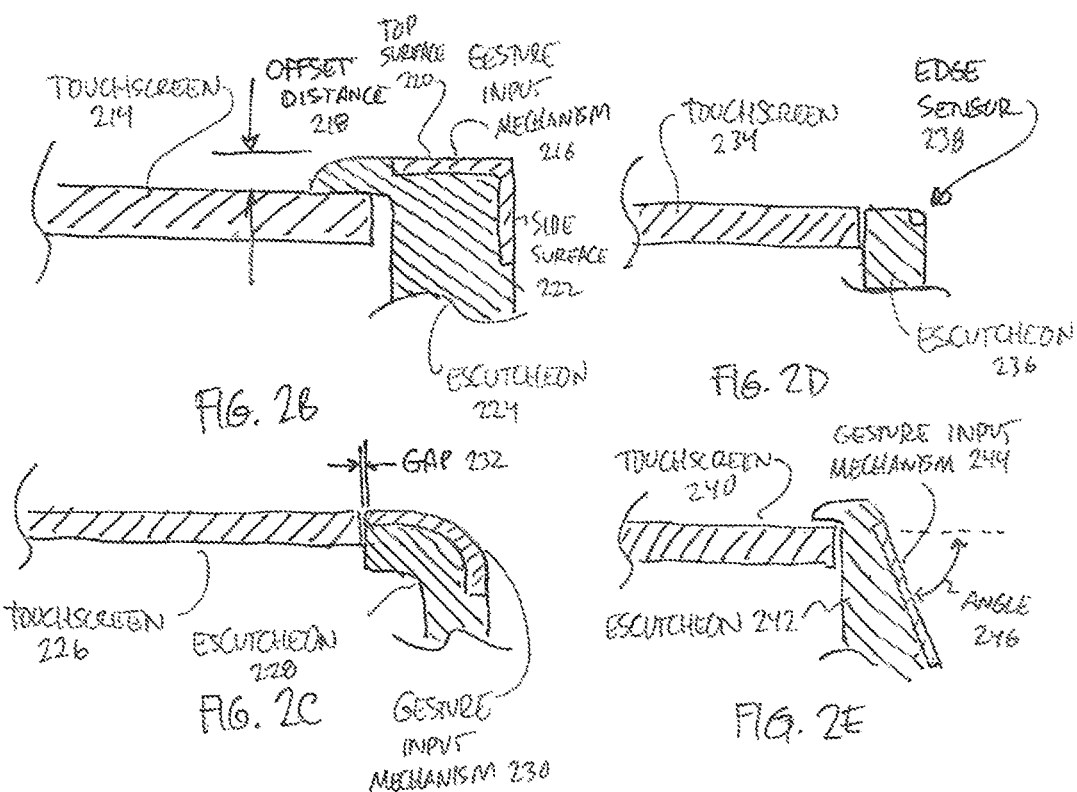

400 DEVICE WITH TOUCHSCREEN

500 — SIMPLIFIED METHOD OF PROCESSING TOUCH INPUT

SECONDARY GESTURE INPUT MECHANISM FOR TOUCHSCREEN DEVICES

BACKGROUND

Touchscreen devices are used for cellular telephones, wrist watches, and many other personal consumer devices. Such devices are often configured to receive various touch gestures, such as tapping, swiping, flicking, and other single point gestures, and many are configured for gestures that may use two or more touch points, such as zooming, rotating, or other gestures.

SUMMARY

A touchscreen device may have a secondary touch-enabled gesture input mechanism located near one or more edges of a touchscreen. The gesture input mechanism may sense several gestures, including swiping, sliding, zooming, tapping, and other gestures, and may cooperate or supplement similar gestures that a user may make with the touchscreen. The gesture input mechanism may be located parallel to one edge of a touchscreen, such that a user may operate the input device without blocking the touchscreen. The gesture input mechanism may be located on a parallel, perpendicular, angled, or other surface with respect to the touchscreen. Some devices may have gesture input mechanisms located around one or more sides of the touchscreen.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings,

FIG. 2A is a diagram illustration of an embodiment showing a device with a gesture input mechanism having a side surface. The illustration is not to scale.

FIG. 2B is a cross-sectional diagram illustration of an embodiment showing a touchscreen device with a gesture input mechanism mounted on two surfaces. The illustration is not to scale.

FIG. 2C is a cross-sectional diagram illustration of an embodiment showing a touchscreen device with a gesture input mechanism that may have a curved cross-section. The illustration is not to scale.

FIG. 2D is a cross-sectional diagram illustration of an embodiment showing a touchscreen device with a gesture input mechanism mounted on an edge of an escutcheon. The illustration is not to scale.

FIG. 2E is a cross-sectional diagram illustration of an embodiment showing a touchscreen device with a gesture input mechanism mounted at an acute angle on the side of an escutcheon. The illustration is not to scale.

DETAILED DESCRIPTION

Figure 1:
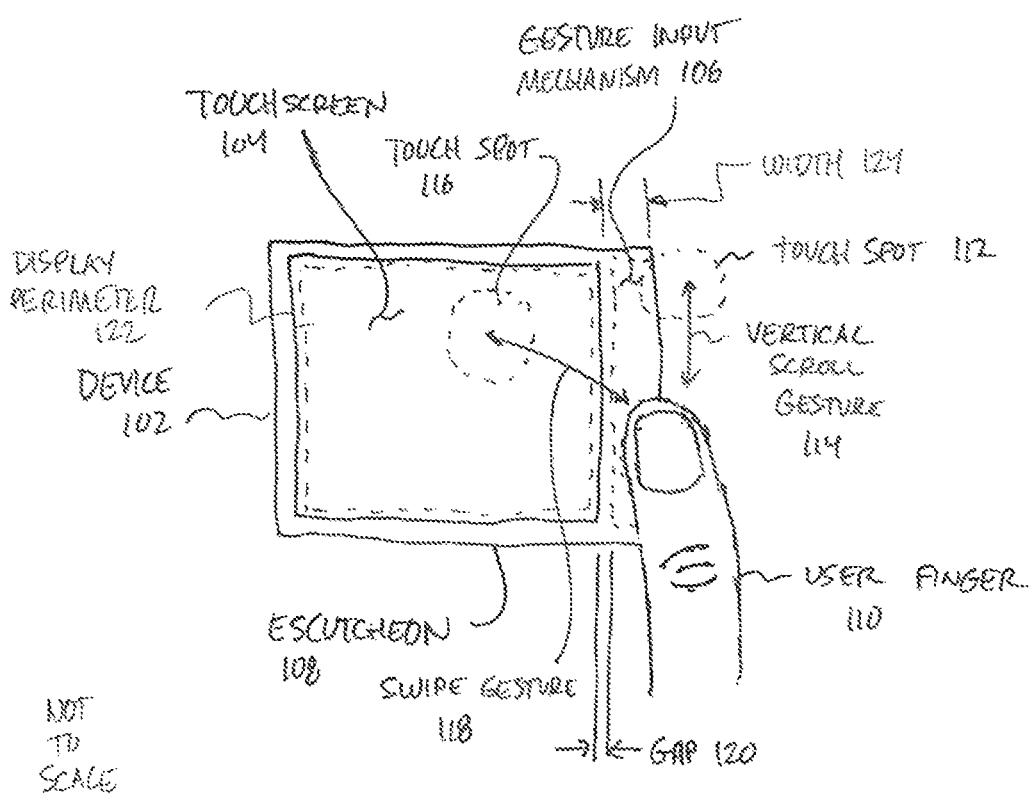
FIG. 1 is a diagram illustration of an embodiment showing a device with a side gesture input mechanism. The illustration is not to scale.

A gesture input mechanism may be located near an edge of a touchscreen. The gesture input mechanism may allow a user to interact with a touchscreen device with minimal or no blocking of the display portion of the device. Such an input device may be useful on smaller touchscreen devices, such as wrist watches or other devices, where a user's finger may block much of the viewable surface. The gesture input mechanism may receive similar gestures as the touchscreen, and may act cooperatively with the touchscreen as an extension or supplement to the touchscreen.

A gesture input mechanism may be located on a housing, bezel, or escutcheon that may surround a touchscreen. The gesture input mechanism may be a capacitive sensing or other touch-sensing device, and may be incorporated into a housing of the device. In some cases, a gesture input mechanism may be located adjacent to a touchscreen such that a user's finger may begin a gesture on the touchscreen and may continue to the gesture input mechanism without interruption. In other cases, a gesture input mechanism may be located parallel to but separate from the touchscreen.

A gesture input mechanism may have a touch surface that may be located on the same plane as a touchscreen. In other cases, a gesture input mechanism may be located on an edge or surface of a device near a touchscreen, and in some cases may be located on a surface perpendicular or angled to the face of a touchscreen.

A gesture input mechanism may be able to detect one, two, or more touches simultaneously. When multiple touches may be used, functions such as zooming in or out may be implemented by a pinching or expanding motion of two fingers. When a single finger may be used, operations such as sliding, scrolling, tapping, or other functions may be implemented.

A gesture input mechanism may have an aspect ratio that may be rectangular, with a longer side of the rectangle being parallel to one side of a touchscreen. In many cases, the major or longer axis of a gesture input mechanism may be 5, 10, 20, or even 50 or 100 times longer than the minor or shorter axis. Such embodiments may include two dimensional sensors, capable of detecting presence and movement in both the major and minor axes of the gesture input mechanism.

In some cases, the gesture input mechanism may be a single dimensional sensor, meaning that the sensor output may register a single dimension, location, or distance which may be measured parallel to the major axis of the gesture input mechanism. In other cases, a gesture input mechanism may be capable of measuring two dimensions, such that that output of the gesture input mechanism may include dimension parallel to as well as orthogonal to the major axis. When two dimensional output may be possible, the gesture input mechanism may be used for two dimensional scrolling, as well as other inputs.

One type of gesture input mechanism may be a transducer with a single array of sensors or other linear arrangement where the side input sensor may detect a single dimensional value of an input. One version of such a device may be mounted on a corner or edge of a bezel.

The gesture input mechanism may be any type of touch transducer. In some cases, the transducer may be a capacitive connection, while in other cases the transducer may be a resistive or other transducer.

A device may include haptic feedback for operations that may be performed with a gesture input mechanism. An example of haptic feedback may be to receive a click or bump with each segment that a display scrolls. The haptic feedback for gestures made on a gesture input mechanism may be different than or the same as haptic feedback for operations performed with the touchscreen portion of the device.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an embodiment 100 showing a touchscreen device with a side gesture input mechanism. The illustration is not to scale.

A device 102 may have a touchscreen 104 interface that may have an additional gesture input mechanism 106 located adjacent to the touchscreen 104. The gesture input mechanism 106 may be mounted on an escutcheon 108.

The gesture input mechanism 106 may allow a user to interact with the device without occluding their view with their finger 110.

Many devices, especially those that have smaller screens, may have touchscreens that may be so small that a user's finger 110 may obstruct the user's view to items shown on a display. The gesture input mechanism 106 may be located near the periphery of the touchscreen 104, such as on the same plane as the touchscreen 104, on the side of the device, or some other location outside the periphery of the touchscreen 104.

A gesture input mechanism 106 may allow a user to interact with the device with the same or similar gestures as may be captured by a touchscreen input interface. For example, a vertical scroll gesture 114 may be performed by moving the user finger 110 to a touch spot 112. Such a gesture may be performed solely on the gesture input mechanism 106 without touching or interacting with the touchscreen 104.

The vertical scroll gesture 114 may allow a user to scroll images on the touchscreen display without blocking the display with the user's finger. Such a benefit may be significant on smaller sized touchscreen devices, such as wristwatches that have touchscreen interfaces, exercise monitoring wristbands, cellular telephones, tablet or other handheld computers, automobile display devices, or any other device where a touchscreen may be used.

The gesture input mechanism 106 may be a one dimensional or two dimensional transducer. A one dimensional transducer may be capable of detecting where a user's finger may be located along the length of the gesture input mechanism 106, and such a transducer may be capable of detecting gestures that include scrolling, swiping, and other linear motions. Many such gestures may involve detecting the motion and speed of a finger along the length of the transducer. In some cases, a user may hold their finger in a position for a short time, then swipe or move their finger along the transducer.

A one dimensional transducer may also be capable of detecting taps, touches, holds, and other gestures that may not involve moving a user's finger along the length of the transducer.

Single dimensional transducers that are used for a gesture input mechanism 106 may be defined by a major axis that aligns with the longest dimension of the transducer. The major axis may be parallel to and offset from one edge of a touchscreen, especially when the touchscreen may be rectangular.

A two dimensional transducer may be used in some gesture input mechanisms 106. Such a transducer may be capable of detecting sideways motion that may be normal to the major axis of the transducer, and may be used to detect a gesture that may span the gesture input mechanism 106 and the touchscreen 104.

For example, a swipe gesture 118 may be performed by moving the user finger 110 from its illustrated position to a touch spot 116. The swipe gesture 118 may begin on the gesture input mechanism 106 and may continue to the touchscreen 104. A processor in the device 102 may receive input from the gesture input mechanism 106 for a first portion of a gesture and input from the touchscreen 104 for a second part of the gesture, and may use both inputs to interpret a single gesture using input from both input devices.

The gesture input mechanism 106 may be located adjacent to the touchscreen 104. In many cases, a gap 120 may be located between the periphery of the touchscreen touch interface and the gesture input mechanism 106. The gap 120 may be less than or greater than 1 mm. Some cases may be 0.1 mm, 0.2 mm, 0.5 mm, 1.5 mm, 2 mm, or larger.

A touchscreen 104 may be planar, curved, or have various shapes. In many cases, the gesture input mechanism 106 may have a touch surface that may be parallel to or offset from the surface of the touch screen.

In many touchscreen devices, a touchscreen 104 may have a touch surface periphery that may define the extent of a touch-sensing surface. A display perimeter 122 may define the outer boundary of the displayable area. In some cases, the touch surface periphery may be larger than or smaller than the display perimeter 122. In the example of embodiment 100, the display input periphery is illustrated as smaller than the touch surface periphery.

FIG. 2A is a diagram illustration of an embodiment 200 showing a device 202 with a touchscreen 204 and a gesture input mechanism 206. Embodiment 200 is not to scale.

Embodiment 200 may illustrate a gesture input mechanism 202 that may have two surfaces: a top surface 208 and a side surface 210. The two surfaces may allow a user to create a gesture using the top surface 208 as illustrated in embodiment 100, as well as to create gestures using the side surface 210.

In some cases, the top surface 208 and side surface 210 may cooperate, such that a single gesture may be identified from touch inputs collected from both surfaces. In other cases, a single gesture may be identified from either but not both surfaces.

The side surface 210 may be used for certain gestures but not for others. For example, the side surface 210 may be used for scrolling in the vertical direction, but may not be used for gestures that involve sideways motion, such as the sideways gesture 118 illustrated in embodiment 100.

Various different designs may be illustrated in subsequent figures as being taken from the section view 212.

FIG. 2B is a diagram illustration of a cross-section embodiment showing a touchscreen 214, an escutcheon 224, and a gesture input mechanism 216. The gesture input mechanism 216 may have a top surface 220 and side surface 222. The illustration is not to scale.

In this example, the top surface 220 of the gesture input mechanism 216 may be offset from the surface of the touchscreen 214 by an offset distance 218. The offset distance 218 may be any distance from zero to 0.1 mm, 0.2 mm, 0.5 mm, 1 mm, or larger.

In this example, the top surface 220 of the gesture input mechanism 216 is illustrated as being above the surface of the touchscreen 214. Other embodiments may have the touchscreen as higher than the gesture input mechanism. Such embodiments may have an offset distance from zero to 0.1 mm 0.2 mm, 0.5 mm, 1 mm, or larger.

FIG. 2C is a diagram illustration of a cross-section embodiment showing a touchscreen 226, an escutcheon 228, and a gesture input mechanism 230. The illustration is not to scale.

The gesture input mechanism 230 may be curved. Such embodiments may or may not have a surface that may be parallel to or offset from the touchscreen 226, and may have any type of shaped surface in cross-section. In this example, the shape may be a constant radius, although any other shape may be used including elliptical, faceted, or other shape.

The gesture input mechanism 230 may be illustrated as being adjacent to the touchscreen 226 with a small gap 232. This example may highlight that the touchscreen 226 touchable surface perimeter may abut or be adjacent to one edge of a gesture input mechanism 230.

FIG. 2D is a diagram illustration of a cross-section embodiment showing a touchscreen 234, an escutcheon 236, and an edge sensor 238. The illustration is not to scale.

In this example, a single dimensional transducer may be mounted on an edge of an escutcheon 236. The single dimensional transducer may be a series of individual point transducers that may be aligned along the edge of the escutcheon 236. The edge sensor 238 may be a single dimensional version of a gesture input mechanism.

FIG. 2E is a diagram illustration of a cross-section embodiment showing a touchscreen 240, an escutcheon 242, and a gesture input mechanism 244. The illustration is not to scale.

In this example, a gesture input mechanism 244 may be located on a side of the escutcheon 242, and may be mounted at an angle 246 from perpendicular to the surface of the touchscreen 240.

Such an example may be useful to provide input to a touchscreen device by touching the side of the device, where a user's finger may not occlude viewing the display within a touchscreen.

In many cases, a gesture input mechanism 244 may be mounted at an acute angle 246 which may be less than a 90 degree angle. Other embodiments may have an angle 246 which may be equal to or larger than 90 degrees.

Figure 3A:
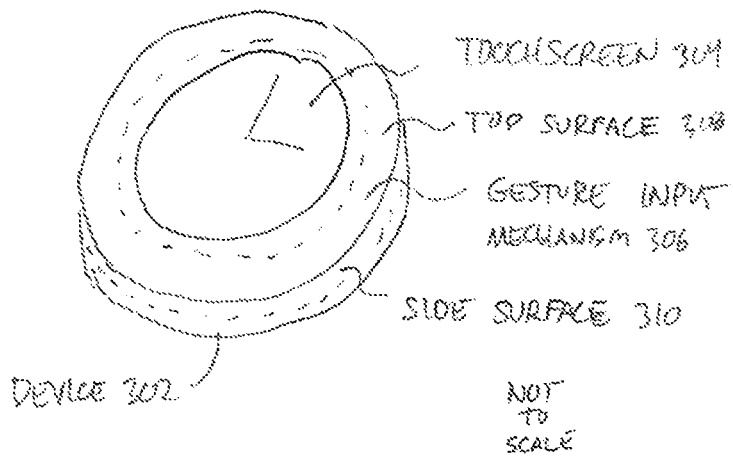
FIG. 3A is a diagram illustration of an embodiment showing a round touchscreen device with gesture input mechanism surrounding the touchscreen. The illustration is not to scale.

FIG. 3A is a diagram illustration of a device 302 with a touchscreen 304 and a gesture input mechanism 306. The illustration is not to scale.

This example shows a touchscreen device that may have a circular or elliptical screen. A gesture input mechanism 306 may be located adjacent to the touchscreen 304, and may be shaped similarly to the touchscreen 304. The gesture input mechanism 306 may have a top surface 308 and a side surface 310.

Figure 3B:
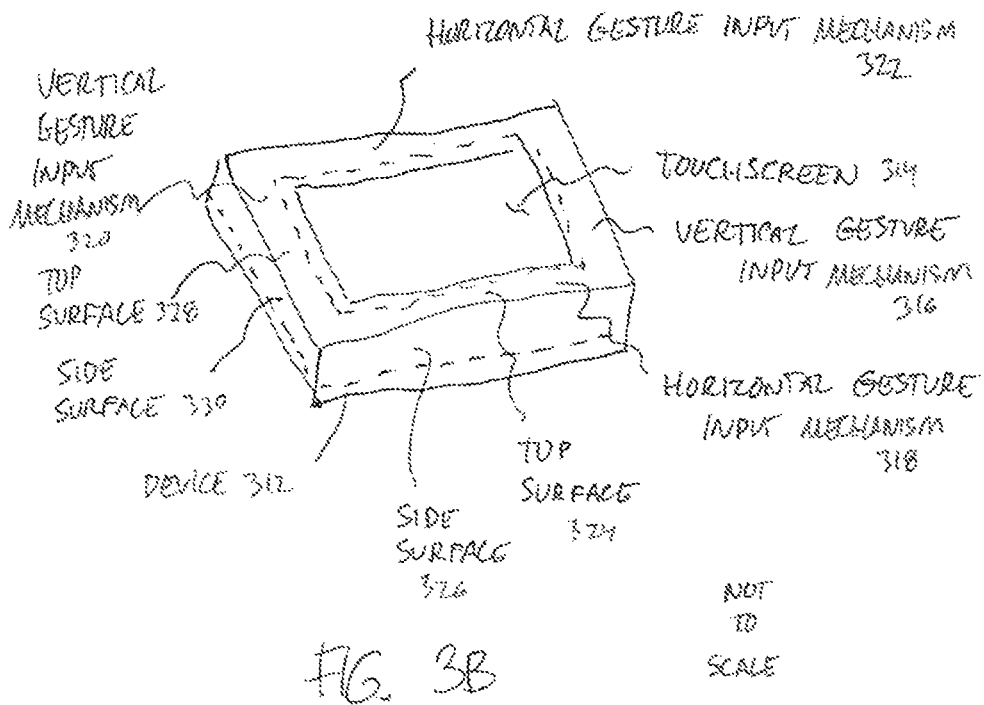
FIG. 3B is a diagram illustration of an embodiment showing a rectangular touchscreen device with gesture input mechanism surrounding the touchscreen. The illustration is not to scale.

FIG. 3B shows a touchscreen device 312 that may have a rectangular touchscreen 314, which may be surrounded by a vertical gesture input mechanism 316, a horizontal gesture input mechanism 318, a second vertical gesture input mechanism 320, and a second horizontal gesture input mechanism 322. The illustration is not to scale.

This example shows a rectangular touchscreen device that may have multiple gesture input mechanisms that may be located around the periphery of the touchscreen 314. In some embodiments, the various gesture input mechanisms may be separate, independent transducers. In other embodiments, a single transducer may be constructed that may surround the touchscreen 314.

The device 312 may have gesture input transducers on both the top and side surfaces. In the example, a top surface 324 and side surface 326 may be illustrated on the horizontal gesture input mechanism 318 and a top surface 328 and side surface 330 may be illustrated on the vertical gesture input mechanism 320. In some embodiments, gesture input mechanisms may be provided on one or more sides only.

Side mounted gesture input mechanisms may be useful for wearable devices, such as fitness monitoring equipment and wristwatches. In many cases, such devices may be mounted on a user's wrist, and a user may use their opposite hand to interact with the device. In an example of a device worn on a user's left forearm, the user may use their right index finger, for example, to scroll a display using a gesture input mechanism mounted on the right side of the device, and may use their right thumb to scroll horizontally using a gesture input mechanism mounted on the lower side of the device. Such interactions may be performed on very small devices without occluding the user's view of a touchscreen display.

Figure 4:
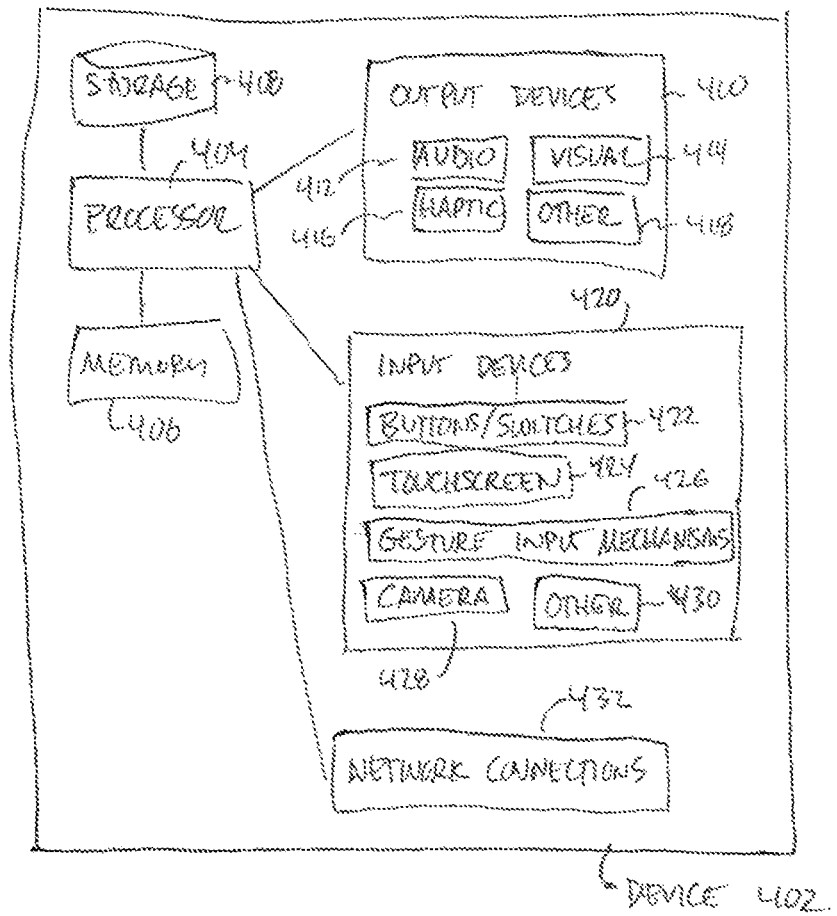
FIG. 4 is a diagram illustration of an embodiment showing functional components of a device with a touchscreen and a gesture input mechanism.

FIG. 4 is a diagram illustration of an embodiment 400 showing functional components of a device 402.

Embodiment 400 may illustrate any type of computing device that may have a touchscreen interface as well as one or more separate gesture input mechanisms. The computing device may be any device that may have a processor 404, which may include electronic wristwatches, personal exercise monitoring equipment, cellular telephones, industrial monitoring displays, personal computers, tablet computers, home security monitors, home automation interfaces, or any other device that may use a touchscreen.

A typical computing device may have a processor 404, memory 406, and storage 408, which may be nonvolatile storage. A typical computing device may have one or more network connections 432 by which the device may connect with other devices. In some cases, the network connections 432 may be wireless connections, although in other cases, the network connections 432 may include hardwired connections.

Various output devices 410 may provide feedback or information to a user. The output devices 410 may include audio output 412, visual output 414, haptic feedback 416, and other output mechanisms. The visual output 414 may be a graphical or text display.

Various input device 420 may allow a user to interact with the device 402. The input devices 420 may include various buttons or switches 422, a touchscreen 424, one or more gesture input mechanisms 426, cameras 428, or other input devices 430.

The touchscreen 424 may be overlaid with the visual output 414, such that a touch input on the touchscreen 424 may be interpreted to be an interaction with objects displayed on the visual output 414. In many cases, the touchscreen input as well as input from the gesture input mechanisms 426 may be calibrated such that the locations of touch inputs may be correlated to a specific location on the visual output, and such that movements detected on the touchscreen and gesture input mechanisms may cause corresponding movements with objects shown in the visual output.

Figure 5:
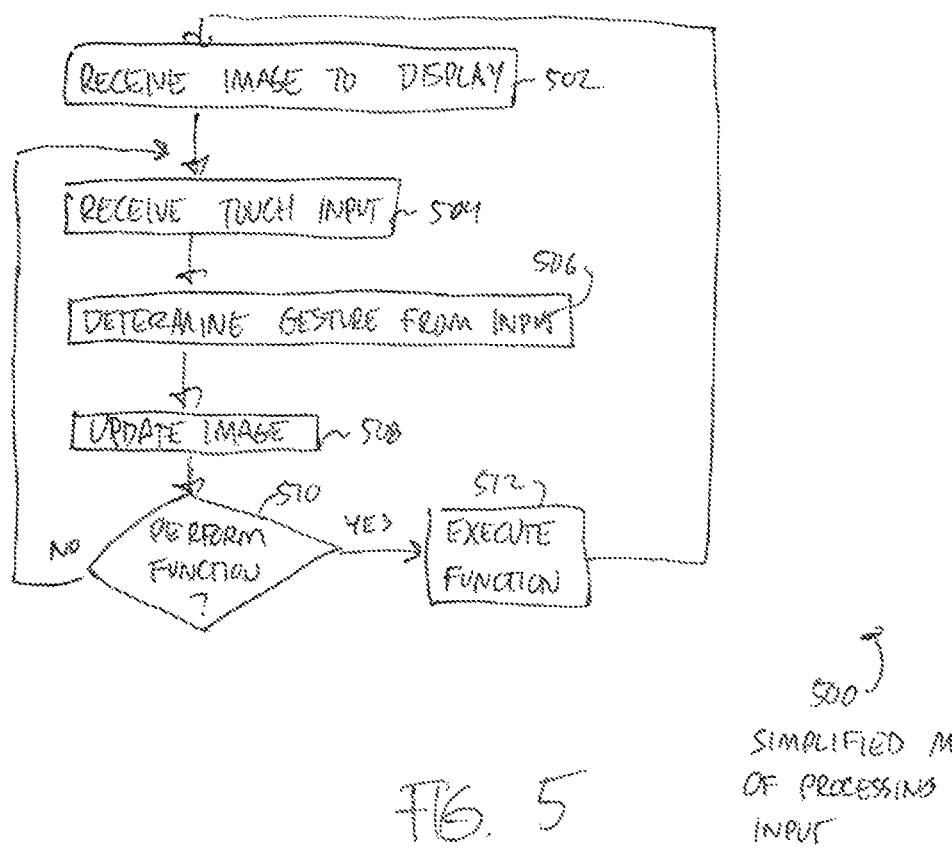
FIG. 5 is a flowchart illustration of an embodiment showing a simplified method for processing touch inputs.

FIG. 5 is a flowchart illustration of an embodiment 500 showing a simplified example method for processing touch input and updating a display with touch gesture input.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

An image may be received in block 502 and may be displayed.

Touch input may be received in block 504 and a gesture type may be determined from the touch input in block 506. An example of a gesture type may be a location The touch input may be received from a touchscreen and/or a gesture input mechanism. In many cases, a gesture may be determined from input from either the touchscreen or gesture input mechanism. Examples of such gestures may be tapping gestures where a user indicates either a specific location with respect to a display or may be selecting, deselecting, clicking on a highlighted object, or performing some other gesture that may use a single location.

In some cases, a gesture may involve movement of a user input. Examples of such gestures may include swiping, scrolling, dragging, panning, and other gestures. Such movement may include movement along either or both of a touchscreen and gesture input mechanism. In some cases, a processor may identify a single gesture from movement detected on a touchscreen and movement detected on a gesture input mechanism.

A gesture may have a set of parameters that may be detected from an input. The parameters may vary with the particular gesture, but may include starting and ending locations, speed, direction, length, path, and other parameters. From the parameters, an image on the display may be updated in block 508.

Some gestures may cause a particular function to be executed. When such a function is identified in block 510, the function may be executed in block 512 and the process may return to block 502 to refresh the display with new images. When no such function has been identified in block 510, the process may return to block 504.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising: a hardware platform comprising a computer processor, said hardware platform being a wrist-mountable wearable device;
   a touchscreen comprising a display having a display perimeter and a touch surface input mechanism having a touch surface perimeter, said touch surface perimeter defining a touch surface;
   a gesture input mechanism separate from and located proximate to said touch surface perimeter;
   said gesture input mechanism having a first sensor surface being mounted at a non-zero degree angle to said touch surface; said computer processor adapted to:

receive a first gesture from said gesture input mechanism, said first gesture being one of a group composed of:

a sliding gesture; and a tapping gesture;

receive a first input comprising a first portion of a gesture from said touch surface input mechanism and a second input comprising a second portion of said gesture input mechanism; and determine a single gesture input from said first portion of said gesture and said second portion of said gesture.

2. The system of claim 1, said gesture input mechanism being located at least 0.5 mm from said touch surface perimeter.

3. The system of claim 1, said gesture input mechanism being located adjacent to said touch surface perimeter.

4. The system of claim 1, said gesture input mechanism being a two dimensional touch sensor.

5. The system of claim 1, said gesture input mechanism being a one dimensional touch sensor.

6. The system of claim 1, said touch surface perimeter being a rectangular perimeter.

7. The system of claim 1, said touch surface perimeter being an elliptical perimeter.

8. The system of claim 1, said touch surface perimeter being a circular perimeter.

9. The system of claim 1, said gesture input mechanism being mounted on an escutcheon.

10. The system of claim 1, said touch surface perimeter defining a touch surface plane, said gesture input mechanism having a gesture surface perimeter defining a gesture surface plane.

11. The system of claim 10, said touch surface plane being parallel to and having a non-zero length offset from said gesture surface plane.

12. The system of claim 10, said touch surface plane having a common edge with said gesture surface plane.

13. The system of claim 12, said touch surface perimeter having at least a 0.5 mm gap between said gesture surface perimeter.

14. The system of claim 1, said gesture input mechanism being mounted on a corner of an escutcheon.

15. The system of claim 14, said gesture input mechanism being a single dimensional input device.

16. The system of claim 14, said gesture input mechanism having a first surface and a second surface, said first surface being disposed at an angle to said second surface.

17. The system of claim 16, said angle being an acute angle less than 90 degrees.

18. The system of claim 1, said non-zero degree angle being 90 degrees.

19. The system of claim 1, said non-zero degree angle being less than 90 degrees and greater than 0 degrees.

20. The system of claim 1, said non-zero degree angle being greater than 90 degrees.

21. The system of claim 1 further comprising a wristband.

* * * * *